United States Patent [19]

Shimizu

[11] Patent Number: 5,007,515
[45] Date of Patent: Apr. 16, 1991

[54] VISCOUS COUPLING APPARATUS
[75] Inventor: Minoru Shimizu, Tochigi, Japan
[73] Assignee: Tochigifujisangyo Kabushiki Kaisha, Japan
[21] Appl. No.: 292,839
[22] Filed: Jan. 3, 1989
[30] Foreign Application Priority Data
  Jan. 12, 1988 [JP] Japan .................. 63-3147
[51] Int. Cl.$^5$ ............................. F16D 35/00
[52] U.S. Cl. ................. 192/58 A; 192/58 B
[58] Field of Search ............... 192/58 R, 58 A, 58 B, 192/58 C; 74/711

[56] References Cited
U.S. PATENT DOCUMENTS

| | | | |
|---|---|---|---|
| 1,095,132 | 4/1914 | Thomson | 192/58 A X |
| 1,888,881 | 11/1932 | Murphy | 192/58 A |
| 2,706,547 | 4/1955 | Ranzi | 192/58 A |
| 2,743,792 | 5/1956 | Ransom | 192/58 B X |
| 3,191,733 | 6/1965 | Weir | 192/58 B |
| 3,209,874 | 10/1965 | Foster et al. | |
| 3,741,359 | 6/1973 | Leichliter | 192/58 B |
| 4,031,780 | 6/1977 | Dolan et al. | 74/711 |
| 4,040,271 | 8/1977 | Rolt et al. | 74/711 X |
| 4,736,828 | 4/1988 | Diessner | 192/58 B |
| 4,782,930 | 11/1988 | Kuroiwa et al. | 192/58 C |

FOREIGN PATENT DOCUMENTS

| | | | |
|---|---|---|---|
| 230962 | 8/1987 | European Pat. Off. | 192/58 C |
| 1192887 | 1/1966 | Fed. Rep. of Germany . | |
| 3436728 | 4/1985 | Fed. Rep. of Germany . | |
| 3627504 | 2/1988 | Fed. Rep. of Germany | 192/58 B |
| 3702299 | 3/1988 | Fed. Rep. of Germany | 192/58 B |
| 435033 | 5/1948 | Italy | 192/58 A |

Primary Examiner—Randolph A. Reese
Assistant Examiner—John A. Ricci
Attorney, Agent, or Firm—Samuels, Gauthier & Stevens

[57] ABSTRACT

To obtain linear characteristics between transmittable torque and differential speed between the two rotary members in the viscous coupling apparatus including a working chamber filled with a viscous fluid and first and second plural annular resistance plates fixed to the first and second rotary members, respectively, at least one of the annular resistance plates is formed with plural blades to agitate the viscous fluid within the working chamber. The blades can be formed by forming a plurality of cutouts in the annular resistance plate in the vortical arrangement manner and then bending the edge of each cutout therealong.

5 Claims, 4 Drawing Sheets

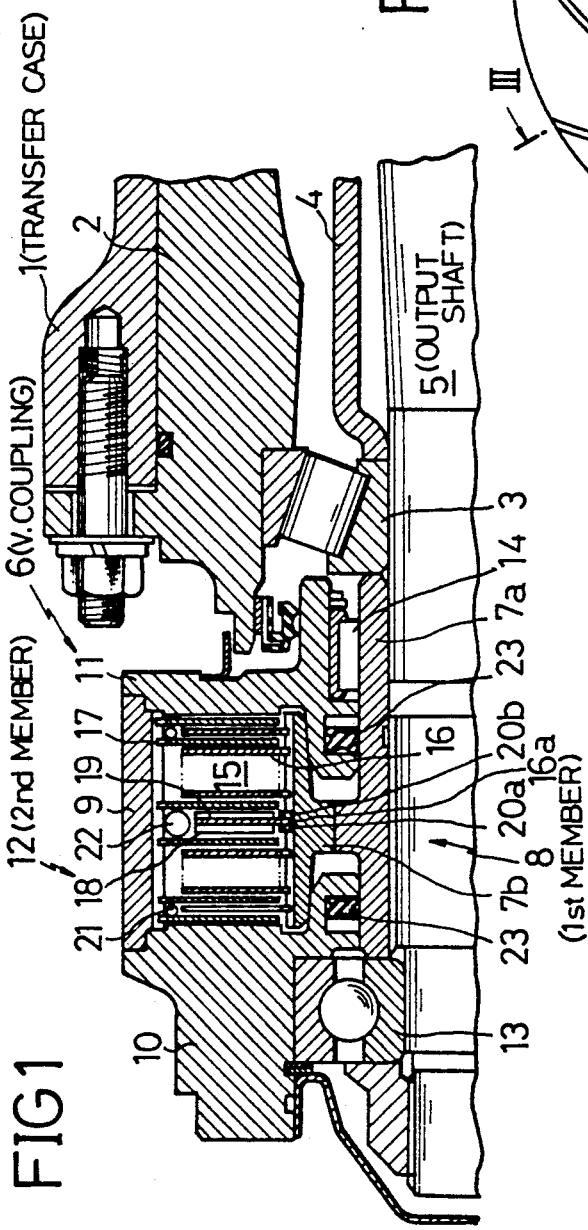
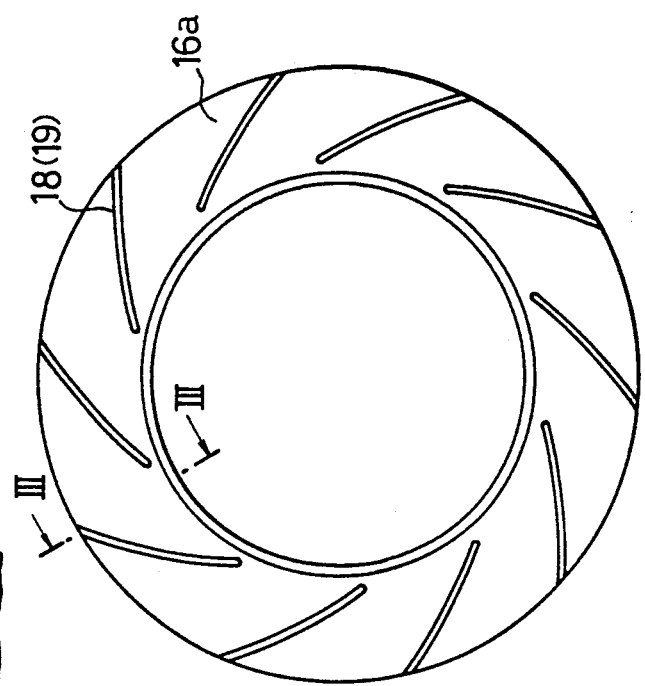
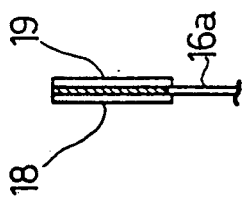
FIG1
FIG2
FIG3

VISCOUS COUPLING APPARATUS

BACKGROUND OF THE INVENTION

1. Field of the Invention

The present invention relates generally to a viscous coupling apparatus incorporated in a power transmission system for automotive vehicles, and more specifically to an improvement in torque characteristics transmitted between two rotary members on the basis of difference in rotational speed between the two rotary members.

2. Description of the Prior Art

In the ordinary power transmission apparatus incorporated in a four-wheel drive vehicle of front wheel drive type, the two front wheels are directly driven by torque transmitted from a transmission, and the two rear wheels are driven by torque transmitted from a transmission via a viscous coupling apparatus. The prior-art viscous coupling is composed of a first rotary member connected to a transfer case, a second rotary member connected to a propeller shaft, a working chamber formed and partitioned between the two first and second rotary members and filled with a viscous fluid, a plurality of first annular resistance plates fixedly arranged at regular axial intervals on an outer circumferential surface of the first rotary member within the working chamber, and a plurality of second resistance plates also fixedly arranged at regular axial intervals on an inner circumferential surface of the second rotary member within the working chamber alternately to each of the first annular resistance plates.

In the above-mentioned power transmission apparatus, however, when the front wheel drive vehicle travels along a muddy road whose frictional coefficient is low, the front wheels tend to slip, so that a difference in rotational speed is produced between the front and rear wheels. As a result, the viscous fluid within the working chamber is sheared off by a great number of first and second annular resistance plates. Therefore, a torque is transmitted from the first rotary member connected to the transfer case to the second rotary member connected to the propeller shaft via the viscous fluid within the working chamber. When the four wheels including the rear wheels are rotated in 4 wheel drive mode in the front wheel drive vehicle, the vehicle can easily get out of the front wheel slipping conditions.

In the prior-art viscous coupling apparatus as described above, however, the relationship between the difference N in speed between the first and second rotary members and the torque T transmitted to the propeller shaft (i.e. rear wheels) is such that as shown by A in FIG. 4, in which T first increases with increasing N but gradually saturates. Therefore, there exists a problem in that it is impossible to transmit a large torque to the rear wheels in a short time, so that it is impossible to quickly allow the vehicle to get out of the front wheel slipping conditions.

In addition, since the torque T increases with increasing rotational difference N between the two rotary members along a curved line, there exists another problem in that the riding comfortability is not preferable when the vehicle gets out of the slipping conditions, because it has been known that the riding comfortability is good when the torque T increases with increasing rotational difference N between the two members in accordance with linear characteristics.

SUMMARY OF THE INVENTION

With these problems in mind, therefore, it is the primary object of the present invention to provide a viscous coupling apparatus which can provide linear characteristics between the transmission torque T and the rotational difference N between the two rotary members.

To achieve the above-mentioned object, a viscous coupling apparatus, according to the present invention, for transmitting a torque from a first rotary member to a second rotary member, comprises: a working chamber formed between the first and second rotary members and filled with a viscous fluid; a plurality of first annular resistance plates fixedly arranged at axial regular intervals on an outer circumferential surface of the first rotary member within the working chamber; and a plurality of second annular resistance plates also fixedly arranged at axial regular intervals on an inner circumferential surface of the second rotary member within the working chamber, at least one of said first and second annular resistance plates being formed with a plurality of blades to agitate the viscous fluid within the working chamber.

In the viscous coupling apparatus according to the present invention, since the at least one annular resistance plate is formed with a plurality of blades, a torque transmitted to the rear wheels according to a differential rotational speed between the two rotary members increases sharply and linearly because the viscous fluid can be agitated more violently. Therefore, it is possible to sharply transmit a large torque to the rear wheels to allow the vehicle from getting out of front wheel slipping conditions without deteriorating riding comfortability when the vehicle travels along muddy road.

BRIEF DESCRIPTION OF THE DRAWINGS

The features and advantages of the viscous coupling apparatus according to the present invention over the prior-art apparatus will be more clearly appreciated from the following description taken in conjunction with the accompanying drawings in which like reference numerals designate corresponding elements and in which:

FIG. 1 is a half cross-sectional view showing a first embodiment of the viscous coupling apparatus according to the present invention;

FIG. 2 is a front view showing an annular resistance plate formed with a plurality of blades on both the surfaces thereof;

FIG. 3 is a cross-sectional view taken along the line III—III in FIG. 2;

FIGS. 9, 9a, and 9b are front views showing a resistance plate formed with another modification of the blades.

DETAILED DESCRIPTION OF THE PREFERRED EMBODIMENTS

Figure 4:
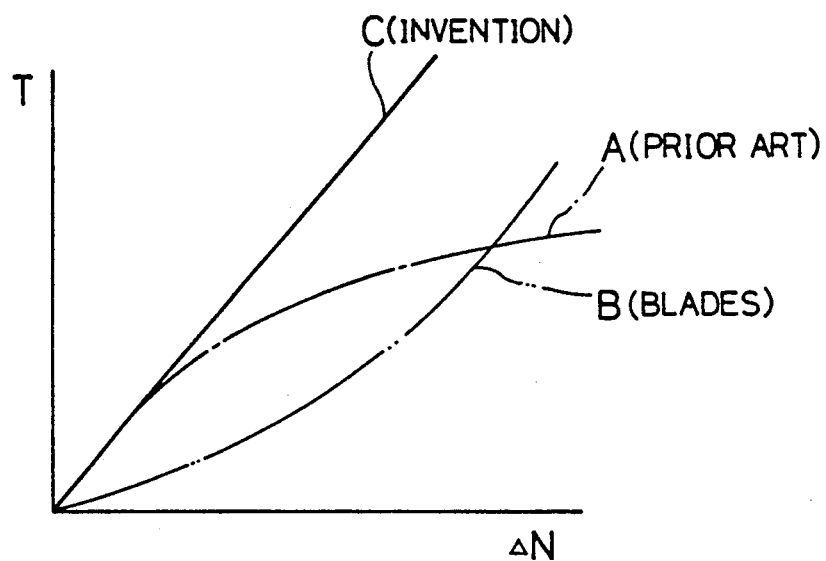
FIG. 4 is a graphical representation showing the relationship between the torque T transmitted between the two rotary members and the differential speed between the two.

An embodiment of the viscous coupling apparatus according to the present invention will be described hereinbelow.

With reference to FIG. 1, an engine torque is transmitted from an engine to a transfer case 1 through a transmission gear (not shown).

An output shaft 5 is rotatably supported within this transfer case 1 via a bearing case 2, a pair of conical bearings 3 (only one is shown), a spacer 4, etc.

This output shaft 5 is connected to a first rotary member 8 via an inner hub 7a fixed to an inner cylindrical member 7b, and coupled to a thick wall cylindrical member 10 fixed to a propeller shaft (not shown), via a viscous coupling device 6. That is, the output shaft 5 is coupled to the propeller shaft (not shown) fixed to the thick wall cylindrical member 10 via a viscous coupling device 6.

In more detail, the inner hub 7a is spline coupled to the output shaft 5 of the transfer case 1. The inner hub 7a is fixed to the inner cylindrical member 7b. These inner hub 7a and the inner cylindrical member 7b construct a first rotary member 8 rotatable together with the output shaft 5.

Concentrically with the first rotary member 8, there is provided a second rotary member 12 composed of an outer cylindrical member 9 coaxial with the inner cylindrical member 7b, a left-side wall member 10 and a right-side wall member 11 both fixed to both side ends of the outer cylindrical member 9. Since the left side wall member 10 is connected to the propeller shaft (not shown), a torque transmitted to the second rotary member 12 via the viscous coupling device 6 is further transmitted to the rear wheels through the propeller shaft, a differential gear, a rear wheel drive shaft, etc. Further, the left side wall member 10 and the right side wall member 11 are supported by the output shaft 5 via a roller bearing 13 and a needle bearing 14, respectively.

Further, two sealing members 23 are disposed between the inner hub 7a and the left side wall member 10, the right side wall member 11, respectively.

An enclosed working chamber 15 is formed between the first rotary member 8 (inner cylindrical member 7b) and the second rotary member 12 (the outer cylindrical member 9). This working chamber 15 is filled with a viscous fluid such as silicon oil.

A plurality of first annular resistance plates 16 are arranged at axial regular intervals on the outer circumferential surface of the outer cylindrical member 7b of the first rotary member 8 so as to be rotatable together therewith. In the same way, a plurality of second annular resistance plates 17 are arranged at axial regular intervals on the inner circumferential wall of the outer cylindrical member 9 of the second rotary member 12 so as to be rotatable together therewith. These first and second annular resistance plates 16 and 17 are arranged alternately each other so as to rotate together with the first and second rotary members 8 and 12 in the circumferential directions thereof, by means of friction force generated by viscous fluid within the working chamber.

The feature of the viscous coupling apparatus according to the present invention is to provide at least one annular resistance plate 16a formed with a plurality of blades 18 or 19 arranged in vortical manner on at least one side surface of the resistance plate 16a.

In the first embodiment shown in FIG. 1, a single first annular resistance plate 16a formed with plural vortically arranged blades 18 and 19 (whose cross section is roughly rectangular) arranged on both the side surfaces thereof at roughly the same positions is disposed at roughly the central position within the working chamber 15. Further, this first annular resistance plate 16a formed with blades 18 and 19 is fixed to the outer circumferential surface of the inner cylindrical member 7b by a pair of stopper rings 20a and 20b in order to prevent the blades 18 and 19 of this first annular resistance plate 16a from being shifted axially into contact with the second annular resistance plates 17 arranged adjacent to the first resistance plate 16a.

Further, a plurality of spacer rings 21 are disposed between two adjacent second resistance plates 17 spline engaged with the inner circumferential wall of the outer cylindrical member 9. In particular, however, a large-diameter spacer ring 22 is disposed over the outer circumferential surface of the first annular resistance plate 16a and between the two second annular resistance plates 17 adjacent to the vortically arranged blades 18 and 19 in order to prevent the blades 18 and 19 from being brought into contact with the second annular resistance plates 17.

The operation of the viscous coupling apparatus shown in FIG. 1 will be described hereinbelow.

When the vehicle travels along a straight paved road, an engine torque is transmitted from the transmission gear to the front wheel drive shaft, so that the vehicle is driven in front wheel drive mode. Under these conditions, the second rotary member 12 connected to the propeller shaft (not shown) rotates together with the first rotary member 8 connected to the transfer case via the viscous coupling device 6, so that the rear wheels rotate simultaneously with the front wheels.

On the other hand, when the vehicle travels along a muddy road (whose frictional coefficient is low) and therefore the front wheels slip, although the first rotary member 8 coupled to the front wheel drive shaft is directly driven by an engine, since the resistance of the front wheels is small, only a small torque is transmitted to the front wheels. That is, since the rotational speed of the rear wheels is smaller than that of the front wheels and therefore the second rotary member 12 coupled to the rear wheel drive shaft rotates at a speed smaller than that of the first rotary member 8 coupled to the front wheel, there exists a rotational difference between the first rotary member 8 and the second rotary member 12, so that the silicon oil is sheared off by the rotational difference between the two rotary members 8 and 12.

A shearing force of the silicon oil generated under these conditions is applied as a torque to the rear wheel drive shaft. Once the rear wheels rotates to drive the vehicle, it is possible to allow the vehicle whose front wheels are slipping to get out of a muddy road.

In the above-mentioned operation of the viscous coupling apparatus, the relationship between the torque T applied to the second rotary member 12 (i.e., the rear wheel drive shaft) and the rotational difference N between the two rotary member 8 and 12 will be explained with reference to FIG. 4. As already explained, in the prior-art apparatus, since the first and second resistance plates 16 and 17 are formed with no blades, the relationship between T and N can be shown as by a dot-dashed curve A.

On the other hand, when the first resistance plates 16a is formed with blades 18 and 19, respectively on both the surfaces thereof as shown in FIGS. 2 and 3, the relationship between T and N can be shown as by a dot-dot-dashed curve B. Therefore, it is possible to obtain linear relationship between T and N as shown by a solid line C in FIG. 4 (obtained by adding two curves A and B) when an appropriate number and shape of blades 18 and 19 are provided for one or plural annular resistance plates 16 or 17.

In the first embodiment shown in FIGS. 1, only the first annular resistance plate 16a disposed at the center within the working chamber 15 is formed with a plurality of blades 18 and 19 of an appropriate size in order to obtain the linear characteristics as shown by solid line C in FIG. 4.

Therefore, whenever the front wheels slip on muddy road, since a torque T transmitted to the rear wheels can increases sharply in proportion to a difference N in rotation speed between the two rotary members 8 and 12, it is possible to transmit a large torque T quickly to the rear wheels in order to restore the slipping vehicle to the normal travel conditions.

In addition, in the viscous coupling apparatus of the present invention, since the relationship between T and N can be designed so as to provide linear characteristics as shown by solid line C in FIG. 4, it is possible to improve the riding comfortability when the vehicle is allowed to get out of the slipping conditions in cooperation with other electronic vehicle travel controlling systems.

Figure 5:
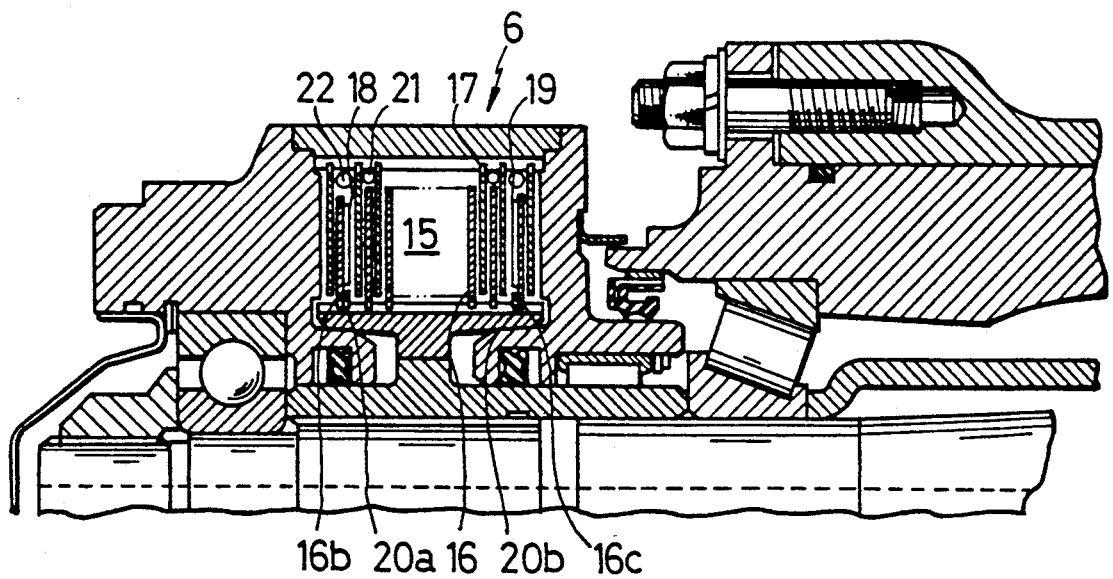
FIG. 5 is a half cross-sectional view showing a second embodiment of the viscous coupling apparatus according to the present invention.

FIG. 5 shows a second embodiment of the apparatus of the present invention, in which the first leftmost side annular resistance plate 16b is formed with a plurality of blades 18 on an inner side surface of the plate 16b and the first rightmost side annular resistance plate 16c is also formed with a plurality of blades 19 on the same inner side surface of the plates 16c. In this second embodiment, two stopper rings 20a and 20b and two large-diameter spacer rings 22 are provided in order to prevent the blades 18 and 19 of the first annular resistance plates 16b and 16c from being brought into contact with the adjacent second annular resistance plates 17.

Figure 6:
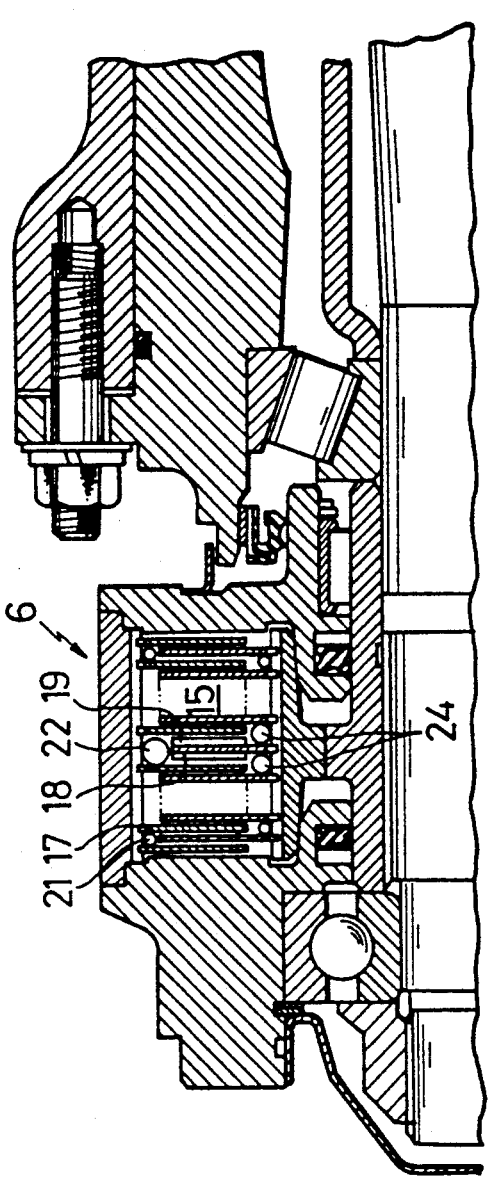
FIG. 6 is a similar cross-sectional view showing a modification of the first embodiment of the viscous coupling apparatus according to the present invention.

FIG. 6 shows a modification of the first embodiment shown in FIG. 1, in which two relatively large diameter spacer rings 24 are disposed instead of the stopper rings 20a and 20b shown in FIG. 1.

Figure 7:
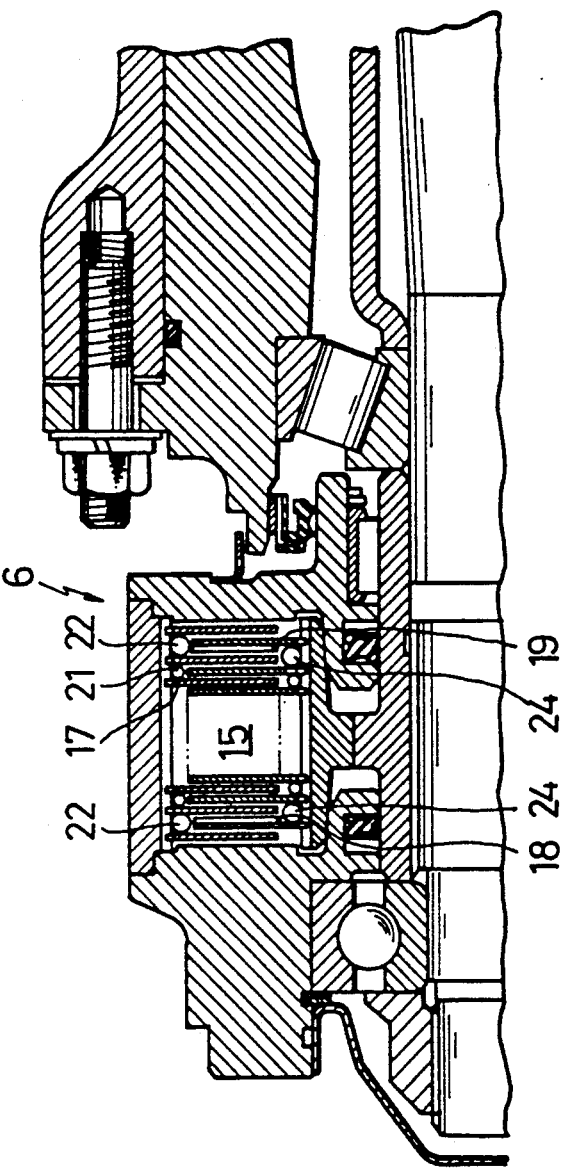
FIG. 7 is a similar cross-sectional view showing a modification of the second embodiment of the viscous coupling apparatus according to the present invention.

FIG. 7 shows a modification of the second embodiment shown in FIG. 5, in which two relatively large diameter spacer rings 24 are disposed instead of the stopper rings 20a and 20b shown in FIG. 5.

Figure 8:
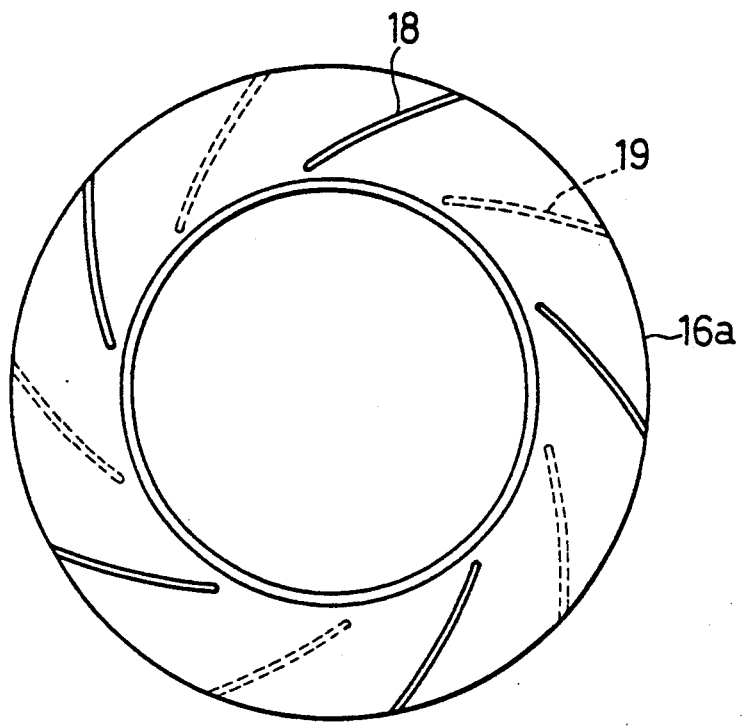
FIG. 8 is a front view showing an annular resistance plate formed with another modification of the blades.

FIG. 8 shows a modification of the first annular resistance plate 16a, in which the plural blades 18 formed on a surface of the resistance plate 16a in vortical manner are arranged at alternate angular positions on two opposite surfaces thereof.

Figure 9:
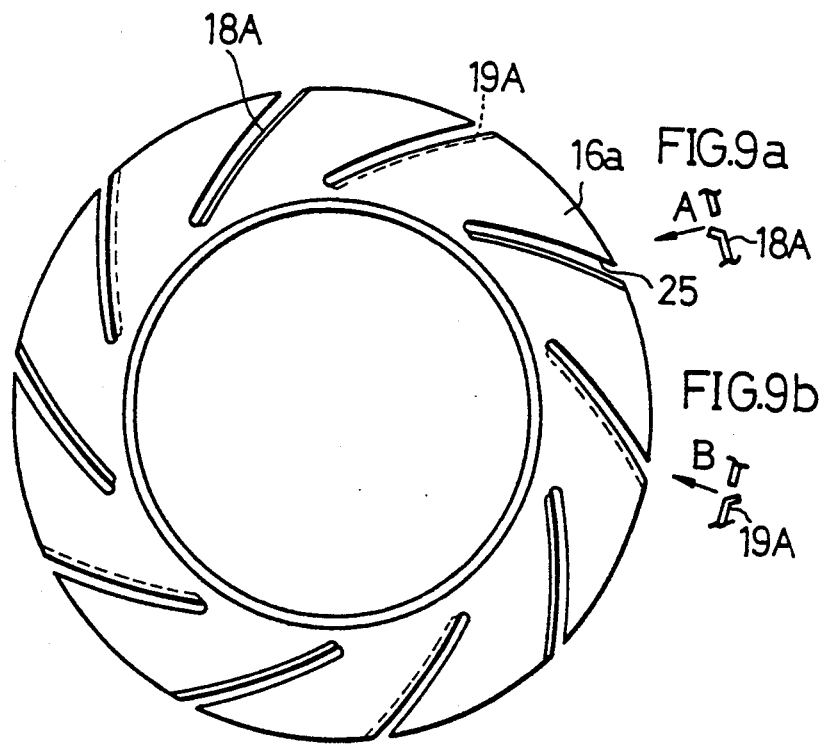

FIG. 9 shows another modification of the first annular resistance plate 16a, in which a plurality of vortically arranged openings (cutout portions) 25 are formed and the edge of each of the openings 25 is bent toward one side, as shown in FIG. 9a, to form a blade 18A or toward the other side, as shown in FIG. 9b, to form a blade 19A. Even in the bend blades 18A and 19A as shown in FIGS. 9, 9a and 9b, it is possible to agitate the viscous fluid effectively within the working chamber to improve the torque transmission characteristics.

In the above embodiments and modifications, description has been made of the first annular resistance plate 16a formed with a plurality of blades. Without being limited thereto, it is of course possible to use the second annular resistance plate 17 formed with a plurality of blades.

Further, the viscous coupling apparatus has been explained by taking the case where installed on one of front and rear wheel drive shafts of a 4-wheel drive vehicle. However, the viscous coupling apparatus of the present invention can be applied to a differential gear disposed between the front and rear wheel shafts.

As described above, in the viscous coupling apparatus according to the present invention, since at least one of the first and second annular resistance plates arranged within the viscous coupling chamber is formed with plural blades, it is possible to sharply increase torque between the two rotary members in proportion to a difference in rotational speed between the two rotary members, and therefore to transmit a large torque to the rear wheels when the vehicle is of front wheel drive type. Therefore, the vehicle can easily get out of slipping conditions on a muddy road. In addition, the above transmission characteristics between the transmitted torque and the rotational speed difference between the two rotary members are linear, it is possible to improve the riding comfortability when the vehicle is allowed to get out of the slipping conditions in cooperation with various electronic controlling systems.

What is claimed is:

1. A viscous coupling apparatus for transmitting torque from a first rotary member to a second rotary member, comprising:
   (a) a working chamber formed between the first and second rotary members and filled with a viscous fluid;
   (b) a series of first annular resistance plates fixedly arranged at axially spaced intervals on an outer circumferential surface of the first rotary member within the working chamber; and
   (c) a series of second annular resistance plates alternating with said first resistance plates and also fixedly arranged at axially spaced intervals on an inner circumferential surface of the second rotary member within the working chamber, one of the annular resistance plates of one of said series being formed with a plurality of vortically shaped blades protruding from both side surfaces thereof at the same angular positions, said one resistance plate being located at a central position within the working chamber to agitate the viscous fluid within the working chamber.

2. A viscous coupling apparatus for transmitting torque from a first rotary member to a second rotary member, comprising:
   (a) a working chamber formed between the first and second rotary members and filled with a viscous fluid;
   (b) a series of first annular resistance plates fixedly arranged at axially spaced intervals on an outer circumferential surface of the first rotary member within the working chamber; and
   (c) a series of second annular resistance plates alternating with said first resistance plates and also fixedly arranged at axially spaced intervals on an inner circumferential surface of the second rotary member within the working chamber, one of the annular resistance plates of one of said series being formed with a plurality of vortically shaped blades arranged at alternate angular positions on both side surfaces thereof, said one resistance plate being located at a central position within the working chamber to agitate the viscous fluid within the working chamber.

3. A viscous coupling apparatus for transmitting torque from a first rotary member to a second rotary member, comprising:

(a) a working chamber formed between the first and second rotary members and filled with a viscous fluid;

(b) a series of first annular resistance plates fixedly arranged at axially spaced intervals on an outer circumferential surface of the first rotary member within the working chamber; and (c) a series of second annular resistance plates alternating with said first resistance plates and also fixedly arranged at axially spaced intervals on an inner circumferential surface of the second rotary member within the working chamber, one of the annular resistance plates of one of said series being formed with a plurality of vortically shaped blades on both side surfaces thereof, said blades being formed by forming plural vortical cutouts and by bending one side edge of successive cutouts alternately towards opposite sides of said one resistance plate, said one resistance plate being located at a central position within the working chamber to agitate the viscous fluid within the working chamber.

4. A viscous coupling apparatus for transmitting a torque from a first rotary member to a second rotary member, comprising:

(a) a working chamber formed between the first and second rotary members and filled with a viscous fluid;

(b) a series of first annular resistance plates fixedly arranged at axially spaced intervals on an outer circumferential surface of the first rotary member within the working chamber; and (c) a series of second annular resistance plates alternating with said first resistance plates and also fixedly arranged at axially spaced intervals on an inner circumferential surface of the second rotary member within the working chamber, one of the annular resistance plates of one of said series being formed with a plurality of vortically shaped blades protruding at alternate angular positions from both side surfaces thereof, said one resistance plate being located at a central position within the working chamber to agitate the viscous fluid within the working chamber.

5. A viscous coupling apparatus for transmitting a torque from a first rotary member to a second rotary member, comprising:

(a) a working chamber formed between the first and second rotary members and filled with a viscous fluid;

(b) a series of first annular resistance plates fixedly arranged at axially spaced intervals on an outer circumferential surface of the first rotary member within the working chamber; and (c) a series of second annular resistance plates alternating with said first resistance plates and also fixedly arranged at axially spaced intervals on an inner circumferential surface of the second rotary member within the working chamber, one of the annular resistance plates of one of said series having a plurality of vortically shaped blades protruding from both side surfaces thereof, said one resistance plate being located at a central position within the working chamber to agitate the viscous fluid within the working chamber, said blades being formed by forming plural vortical cutouts in said one resistance plate and by bending one side edge of each successive cutout alternately toward opposite sides of the plate.

* * * * *